United States Patent [19]

Yamakami

[11] Patent Number: 5,462,337
[45] Date of Patent: Oct. 31, 1995

[54] POWER SEAT DRIVING APPARATUS FOR A VEHICLE

[75] Inventor: Gensaku Yamakami, Seta, Japan

[73] Assignee: Matsuba Electric Manufacturing Co., Ltd., Kiryu, Japan

[21] Appl. No.: 115,559

[22] Filed: Sep. 3, 1993

[30] Foreign Application Priority Data

Sep. 4, 1992 [JP] Japan .................................. 4-262829

[51] Int. Cl.$^6$ ...................................................... B60N 2/02
[52] U.S. Cl. ................................ 297/344.13; 192/48.1; 74/665 GD; 74/89.15
[58] Field of Search ............................... 297/330, 327, 297/329, 344.12, 344.13, 344.15, 344.17, 344.18, 344.2; 248/422, 421, 394, 396; 192/48.1, 48.91; 74/665 GD, 89.15

[56] References Cited

U.S. PATENT DOCUMENTS

| 2,839,124 | 7/1958 | Desmond et al. | 297/344.17 X |
| 2,919,744 | 1/1960 | Tanaka | 297/344.13 X |
| 3,022,681 | 2/1962 | Cook | 74/665 GD X |
| 3,125,318 | 3/1964 | Lohr et al. | 248/419 |
| 3,194,530 | 7/1965 | Heyl, Jr. | 248/419 |
| 5,014,958 | 5/1991 | Harney | 297/344.13 X |

FOREIGN PATENT DOCUMENTS

| 58-89429 | 5/1983 | Japan . |
| 61-77538 | 4/1986 | Japan . |
| 63-159153 | 7/1988 | Japan . |
| 63-159154 | 7/1988 | Japan . |
| 63-159151 | 7/1988 | Japan . |
| 63-159152 | 7/1988 | Japan . |
| 63-162348 | 7/1988 | Japan . |
| 63-199138 | 8/1988 | Japan . |
| 63-199139 | 8/1988 | Japan . |

*Primary Examiner*—Kenneth J. Dorner
*Assistant Examiner*—Milton Nelson, Jr.
*Attorney, Agent, or Firm*—Oliff & Berridge

[57] ABSTRACT

A driving apparatus which is capable of adjusting the forward and backward position and the height of a seat section by using a single motor to reduce the weight of the apparatus and simplify the structure. Nut members are mounted on operating threaded shafts which are rotated in normal or reverse by an electric motor so that the operating threaded shafts go through the nut members. A nut body constituting each nut member is structured so as to be engaged with one of first and second clutch members by a clutch operating member. In the first shift condition where the nut body is engaged with the first clutch body, power is turned on and the nut member moves back and forth relative to the operating threaded shaft. In the second shift condition where the nut is engaged with the second clutch body, power is turned off to hinder the movement of the nut member. The system of the apparatus is arranged so that the first nut members adjust the forward and backward position of the seat section and the second nut member adjusts the heights of the seat at the front and rear ends.

12 Claims, 6 Drawing Sheets

POWER SEAT DRIVING APPARATUS FOR A VEHICLE

BACKGROUND OF THE INVENTION

1. Field of the Invention

The present invention relates to a power seat driving apparatus for a vehicle which is installed on a passenger car or truck.

2. Description of Related Art

Generally, a seat installed on a passenger car or truck can be adjusted by moving the seat back and forth corresponding to the physique of a driver. Additionally, some seats can be adjusted with regard to the seat height at the front and rear ends to make the driver more comfortable. For the purpose, it has been proposed that the adjustments of the horizontally longitudinal position of the seat section and the heights of the seat at the front and rear ends are performed by using an electric motor. In conventional apparatuses, dedicated motors are used for each driving part to achieve such adjustment of each part of the seat because the operating positions and directions are different from each other and so each adjusting device is driven by an electric motor. However, this kind of system uses a large number of parts, not only complicating the structure but also enlarging the size of the seat driving system. For this reason, the space where other various functions will be loaded may decrease and further assembly becomes complicated, increasing manufacturing cost.

SUMMARY OF THE INVENTION

Accordingly, an object of the present invention is to provide a power seat driving apparatus for a vehicle which is capable of solving the problems mentioned above. To achieve the above object, according to one aspect of the present invention, there is provided a power seat driving apparatus for a vehicle comprising: an electric motor mounted in a seat section; a plurality of operating threaded shafts which are rotated by the electric motor and; nut members which are mounted integratedly on the body of the apparatus and screwed to the operating threaded shafts, the driving apparatus being structured to move the seat section back and forth relative to the operating threaded shafts by a movement of at least one nut member mounted on an operating thread shaft, driven by the operating threaded shaft accompanied by the normal or reverse rotation of the electric motor, the power seat driving apparatus for a vehicle further including second nut members mounted on the operating threaded shafts and being structured to selectively achieve a different adjustment of a seat from the adjustment of the horizontally longitudinal position of the seat section by the movement of the second nut members relative to the operating threaded shafts, comprising; the operating threaded shafts on whose circumference a locking section is formed; a casing in which an operating threaded shaft movably goes through a nut member mounted thereon; the nut body supported rotatably in the axial dimension by the casing while the operating threaded shaft is screwed through the nut body; a first clutch body through which the operating threaded shaft passes so that the first clutch body can rotate and move axially and which is provided on one side of the nut body so that the clutch body is capable of being engaged with the one side; a second clutch body which the operating threaded shaft passes through while the second clutch body is engaged with the locking section of the operating threaded shaft and which rotates together with the operating threaded shaft, and which is further capable of moving axially relative to the operating threaded shaft; a connecting lever which supportedly connects the first and second clutch bodies which are located facing each other across the nut body, having a length which makes one clutch body disengage from the nut body when the other clutch body is engaged with the nut body; means for hindering the rotation of the first clutch body while the rotation of the second clutch body is permitted; and a clutch operating means which switches the clutch bodies between the first shift condition where the first clutch body is engaged with the nut body and the second shift condition where the second clutch body is engaged with the nut body.

BRIEF DESCRIPTION OF THE DRAWINGS

FIG. 4 is a schematic sectional view along 4—4 showing the condition where the nut member of FIG. 3 is turned on.

FIG. 8 is a schematic perspective view showing the condition where the nut member of a third embodiment is turned on.

DESCRIPTION OF THE PREFERRED EMBODIMENTS

Figure 1:
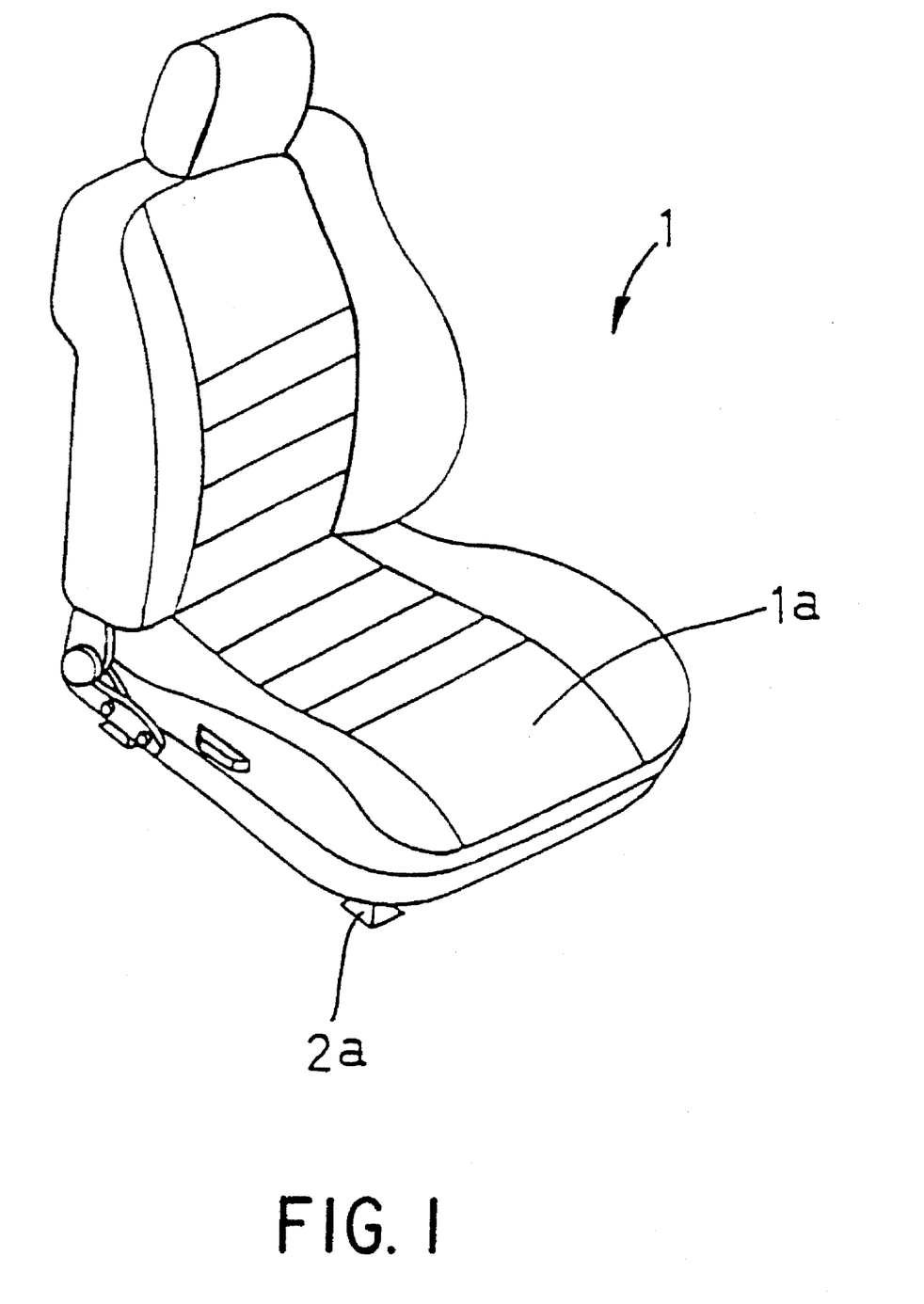
FIG. 1 is a schematic perspective view of the seat section.

An embodiment of the present invention will be described with reference to the accompanying drawings. In FIG. 1, reference numeral 1 indicates a seat section which is to be disposed in a vehicle, such as a passenger car or truck. An electric driving apparatus 2 which is an embodiment of the present invention is disposed under the seat section 1 and structured to be able to not only move the seat section 1 back and forth, but also adjust the heights of the front and back portions of a seat 1a constituting the seat section.

Figure 2:
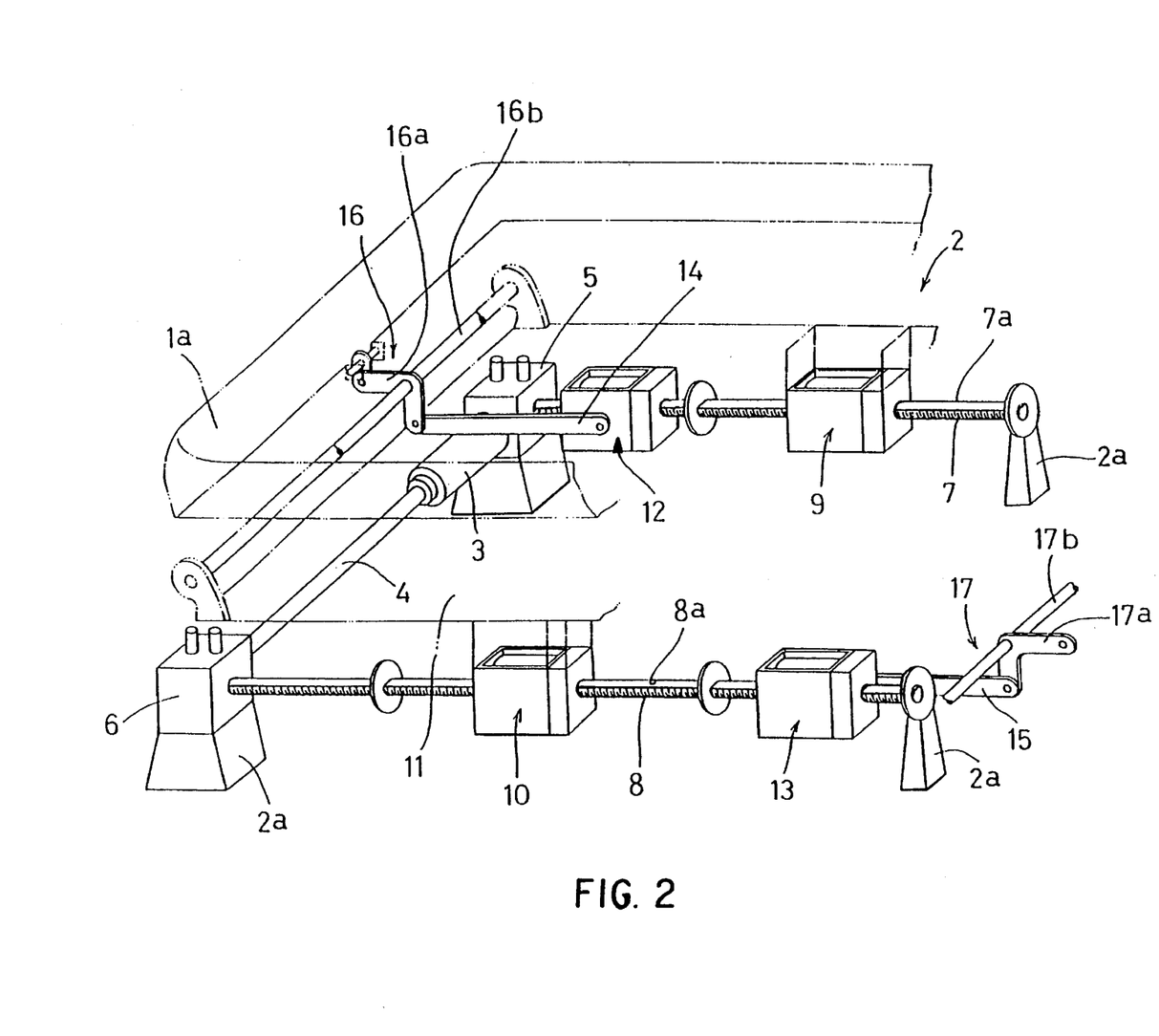
FIG. 2 is a schematic explanatory view showing an arrangement of an electric driving apparatus for a seat.

The electric driving apparatus 2 is located under the seat section 1 and integratedly mounted on the floor of a vehicle. An output shaft 4 extends from an electric motor 3, of the electric driving apparatus 2, and is connected to decelerating gear devices 5, 6 provided on the right and left ends, respectively of the output shaft 4, the decelerating gear devices 5, 6 being integratedly fixed to supports 2a integratedly provided on the floor surface. Reference numerals 7, 8 indicate first and second operating threaded shafts respectively, the axes of which extend longitudinally and on which circumferences engaging sections (although only one side of each shaft is chamfered in the present embodiment, two-side chamfering is acceptable and further engaging grooves are also acceptable) 7a, 8a are formed, respectively.

The operating threaded shafts 7, 8 are rotated around their axes in synchronization with the driving of the electric motor 3. The back ends of the shafts are rotatably supported by the supports 2a integratedly provided on the floor and the front ends of the shafts are connected to the decelerating gear devices 5, 6, so that the decelerated driving force of the electric motor 3 is transmitted to the first and second operating threaded shafts 7, 8. The operating threaded shafts 7, 8 are threadedly engaged with, respectively, first nut members 9, 10 which are located in the respective middle portions of the operating threaded shafts 7, 8, the nut members being moved back and forth relative to the operating threaded shafts 7, 8 by the rotation of the operating threaded shafts 7, 8. The first nut members 9, 10 are fixed to a movable bracket 11 on which the seat section 1 is integratedly mounted. As described later, when the apparatus is powered on, the seat section 1 is moved back and forth by the back and forth movement of the first nut members 9, 10 relative to the operating threaded shafts 7, 8 based on the rotation of the operating threaded shafts 7, 8.

A second nut member 12 is threadedly engaged with the operating threaded shaft 7 in front of the first nut member 9 of the first operating threaded shaft 7, and a second nut member 13 is threadedly engaged with the operating threaded shaft 8 in the back of the first nut member 10 of the second operating threaded shaft 8. When the apparatus is powered on as described later, the second nut members 12, 13 are moved back and forth relative to the operating threaded shafts 7, 8 respectively in accordance with the rotation of the operating threaded shafts 7, 8. Further, the second nut members 12, 13 are connected to height adjusting devices 16, 17 disposed on the front and rear portions of the movable bracket 11 through connecting levers 14, 15, respectively. The height adjusting devices 16, 17, having operating arms 16a, 17a respectively. The centers of the operating arms 16a, 17a, are fixed to supporting levers 16b, 17b respectively, which are rotatably supported by the movable bracket 11, respectively. When the second nut members 12, 13 are moved back and forth relative to the operating threaded shafts 7, 8, the connecting levers 14, 15 are moved back and forth, thereby moving the other ends of the operating arms 16a, 17a up and down. The other ends of the operating arms 16a, 17a are connected to the front and rear portions of the seat section 1a to adjust the heights of the front and rear portions of the seat section 1a, respectively.

The first nut members 9, 10 and the second nut members 12, 13 which are provided on the first and second operating threaded shafts 7, 8 respectively, are configured as will be described below. The first and second nut members are set so that the movement of the first and second nut members relative to the operating threaded shafts 7, 8 can be selectively switched on to make a desired adjustment of the seat section 1. As the nut members 9, 10, 12, and 13 have the same structure, for the sake of convenience, only the first nut member 9 is described below.

Figure 3:
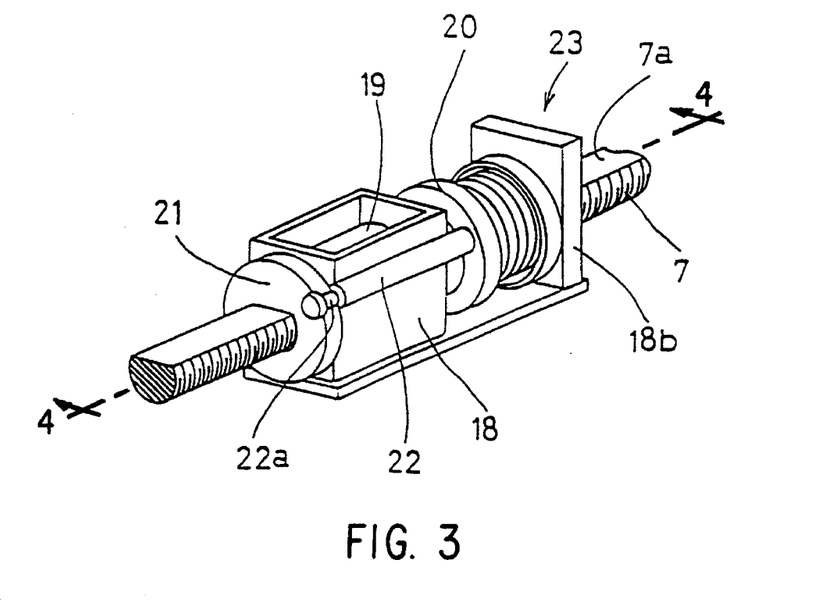
FIG. 3 is a schematic perspective view of the nut member.
Figure 4:
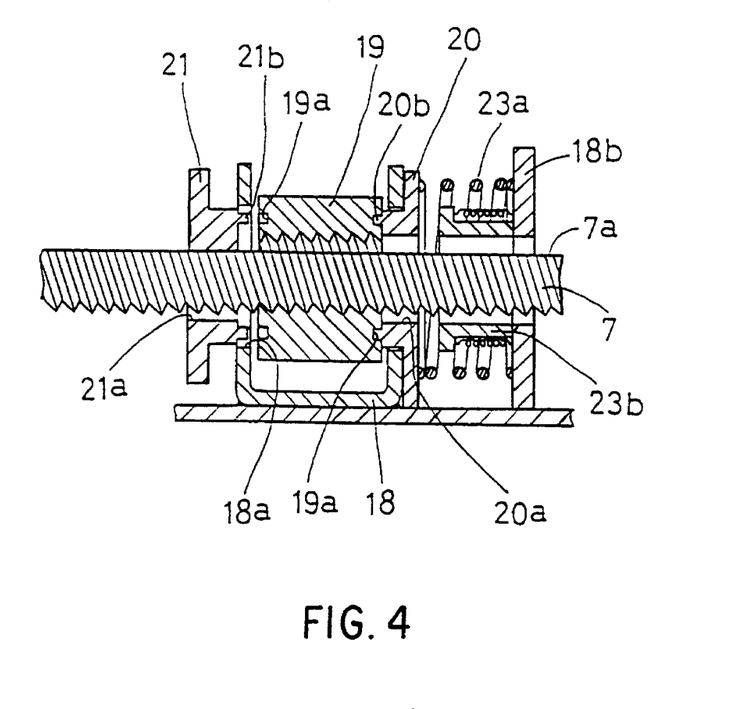

The nut member 9 contains a nut body 19 in a casing 18, the casing having a through hole 18a through which the operating threaded shaft 7 movably passes so that the operating threaded shaft 7 is freely movable. The nut body 19 is engaged with the operating threaded shaft 7 so that the operating threaded shaft passes through the nut body 19 and the nut body 19, in the casing 18, is freely rotatable around the operating threaded shaft 7. The nut body 19 has engaging grooves 19a on both sides, or ends, in axial dimensions. A fixed member 18b, which the operating threaded shaft 7 passes through, moves axially relative to the operating threaded shaft 7 and is integratedly fixed to the casing 18. The fixed member 18b is equipped with a clutch operating means 23 which is described later and moves integratedly with the casing 18. Further, an approximately circular first clutch body 20 is provided axially on one side, on end of the nut body so that the clutch body 20 is not rotatable relative to the casing 18. A through hole 20a, provided in the first clutch body 20 has a larger diameter than the operating threaded shaft 7. The first clutch body 20 is held on the casing 18 so that it is axially movable relative to the operating threaded shaft 7. Additionally, an engagement protrusion 20b, which is engageable with the engaging groove 19a of the nut body 19, is formed on the surface of the first clutch body 20 facing the nut body 19.

Figure 6A:
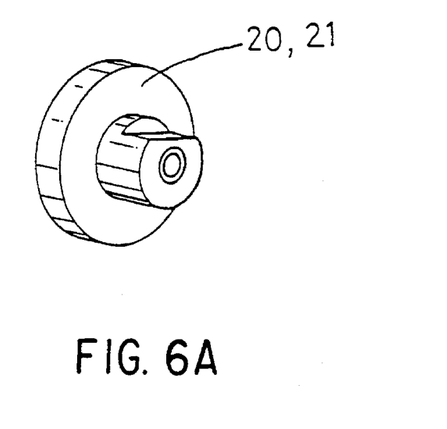
FIGS. 6A, B are schematic perspective views of the clutch body.
Figure 6B:
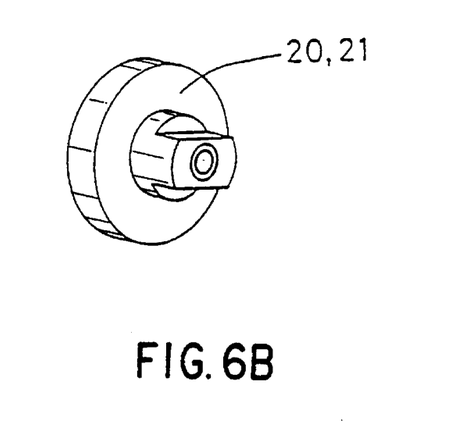

Further, an approximately circular second clutch body 21 is provided axially on the other side, or end, of the nut body 19 and a through hole 21a is provided in the second clutch body 21. The through hole 21a has a surface opposing the locking section 7a of the operating threaded shaft 7, providing a shape to movably hold the operating threaded shaft 7. Thus, the second clutch body 21 is capable of rotating together with the operating threaded shaft 7 and moving axially freely. Further, an engaging protrusion 21b, which can be engaged with the engaging groove 19a formed on the other side, or end, of the nut body 19 is formed on the surface of the second clutch body 21 facing the nut body 19. The first clutch body 20 and the second clutch body 21, which are arranged to face each other across the nut body 19, are connected by means of a connecting rod 22 which has such a length that, when one of the clutch bodies 20 and 21 is engaged with the nut body 19, the other clutch body 21 or 20 is released from the engagement with the nut body 19. The connecting rod 22 is integratedly fixed to the first clutch body 20. The periphery of the second clutch body 21 is slidably engaged with an annular groove 22a provided on the connecting rod 22 so that the first and second clutch bodies move together axially. The first clutch body 20 is prevented from rotation. However, the second clutch body 21 is permitted to rotate freely. Meanwhile, the engagement of the clutch body 20, 21 with the nut body 19 is not confined to locking by engaging the protrusion 20b, 21b with the engaging grooves 19a, but an engagement of chamfered sections, such as shown in FIG. 6(A), 6(B), is also acceptable. The first clutch body 20 is freely movable in the axial dimension relative to the casing 18 and held so that it is unrotatable. Thus, shown in FIG. 7 of the second embodiment the first clutch body 20 is structured to hinder rotation by making the bottom face of the first clutch body 20 contact the bottom surface of the casing 18. However the means for hindering the rotation of the first clutch body 20 is not confined to these embodiments.

Figure 5:
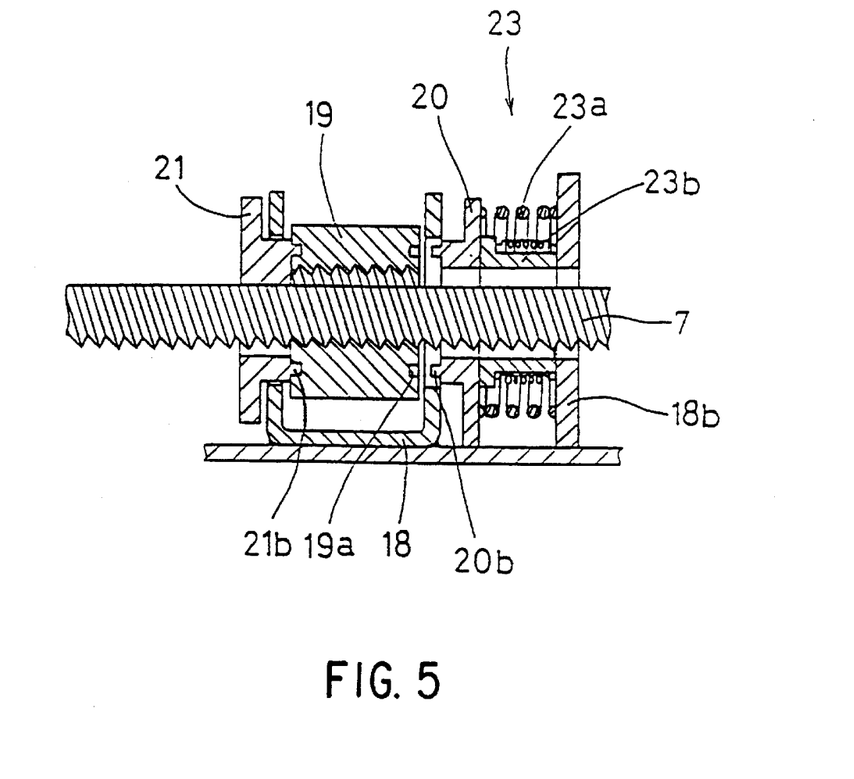
FIG. 5 is a schematic sectional view along 4—4 showing the condition where the nut member of FIG. 3 is turned off.

Reference numeral 23 indicates the clutch operating means which selectively engages the first and second clutch bodies 20, 21 with the nut body 19. The clutch operating means 23 is provided between the fixed member 18b of the casing 18 and the first clutch body 20, and comprises a spring 23a which always energizes the first clutch body 20 to be engaged with the nut body 19 and an exciting coil 23b which is excited when powered on in order to disengage the first clutch body 20 from the nut body 19 against the action of the spring 23a and to cause the second clutch body 21 to be engaged with the nut body 19. When the first clutch body 20 is engaged with the nut body 19 (the second clutch 21 remains disengaged from the nut body 19), which condition is called the first shift when the operating threaded shaft 7 is rotating as described above, the nut body 19 is prevented from rotating by the first clutch body 20 which is engaged with the nut body 19. Consequently, the nut member 9 moves back and forth relative to the operating threaded shaft 7. However, when the second clutch body 21 is engaged with the nut body 19 (then the first clutch body 20 is disengaged from the nut body 19), which is called the second shift, the nut member 19 rotates together with the second clutch body 21 which is engaged with the nut body 19 as the operating threaded shaft 7 rotates. Consequently, the relative movement of the nut body 9 to the operating threaded shaft 7 is prevented.

The embodiment of the present invention configured as described above permits adjusting of the forward and backward position of the seat section 1 and the heights of the seat 1a at its front and rear ends. For example, when adjusting the height of the seat 1a at the front end, the exciting coil 23b contained in the clutch operating means 23 provided in the second nut body 12 is powered off, so that the nut body 19 is disengaged from the second clutch body 21 and is engaged with the first clutch body 20, which condition is referred to as the first shift. The exciting coils 23b of the other nut means 9, 10 and 13 are powered on to place the nut means 9, 10 and 13 in the second shift condition. Then, the electric motor 3 is driven in normal or reverse, moving only the nut member 12 back and forth relative to the operating threaded shaft 7 in order to adjust the height of the front end of the seat 1a. When adjusting the forward and backward position of the seat section 1, the nut bodies 19 in the first nut members 9, 10 are placed in the first shift condition and the nut members 12, 13 are placed in the second shift condition, and then, the electric motor 3 is driven.

As described above, the present invention has achieved automatic adjustments of the forward and backward position of the seat section 1 and the heights of the seat 1a at the front and rear ends by electric driving force. The adjustments of the forward and backward position of the seat section 1 and the heights of the seat 1a at the front and rear ends can be selected by controlling the power to be supplied to the exciting coils 23b by means of the clutch operating means 23 provided in the first and second nut members 9, 10, 12 and 13. Thus, the drive control of the adjusting devices can be achieved by driving a single electric motor, eliminating the necessity of mounting a dedicated motor on each adjusting device. As a result, a large number of the adjusting parts are used in common, thereby minimizing the number of the parts, reducing the weight of the apparatus, simplifying the structure of the apparatus and further simplifying assembly which leads to the reduction of manufacturing cost.

Figure 7:
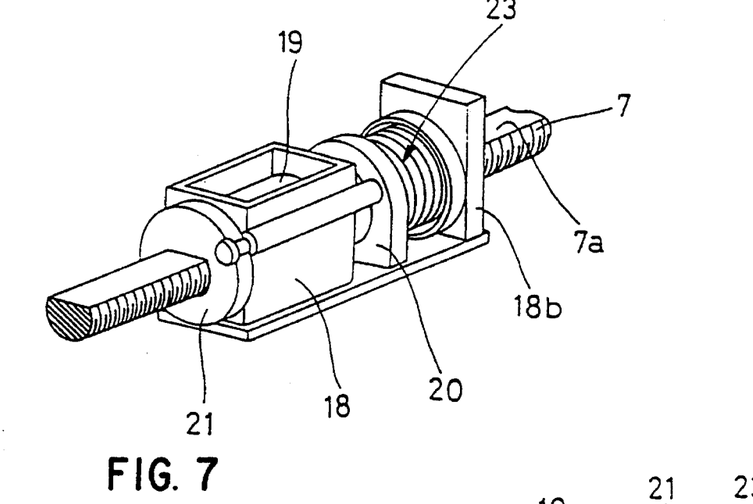
FIG. 7 is a schematic perspective view showing a second embodiment relating to of the nut member.
Figure 8:
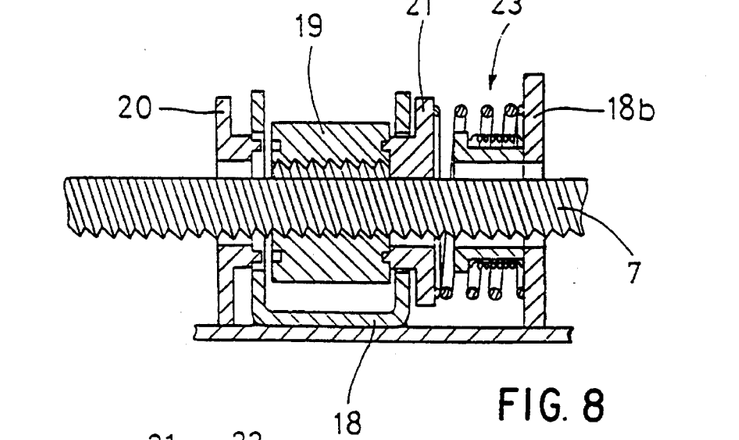
Figure 9:
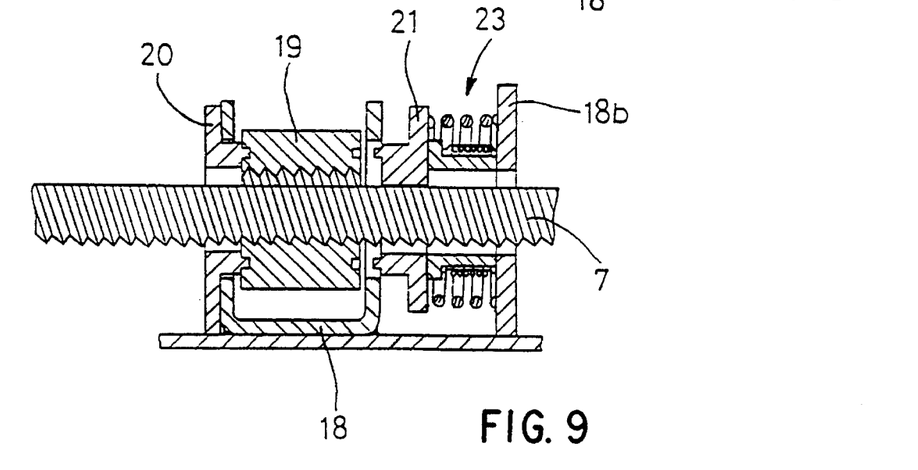
FIG. 9 is a schematic sectional view showing the condition where the member of the third embodiment is turned off.

Meanwhile, it can be foreseen that there may be the case where, when the exciting coil 23b is broken, switching of the engagement and disengagment of the clutch bodies 20, 21 cannot be performed. According to the above described embodiment, when the exciting coil 23b is not powered on, all the devices are placed in the first shift condition. When the operating threaded shafts 7 are rotated, all the nut members 9, 10, 12 and 13 move relative to the operating threaded shaft. Thus, shown in FIGS. 8 and 9 of the third embodiment, the nut members 9, 10, 12 and 13 may be structured so that the second clutch body 21 is engaged with the nut body 19 when the exciting coils 23b are not powered on (FIGS. 7–9). This case has an advantage that a nut member is capable of making an appropriate corresponding adjustment by powering on only the exciting coil 23b, which can accept power supply even under the estimated condition mentioned above. Further, if the nut members 9, 10 for adjusting the forward and backward position of the seat section 1 are set so that the first clutch body 20 is engaged with the nut body 19 when they are not powered on and the nut members 12, 13 for making the other adjustment are set so that the second clutch body 21 is engaged with the nut body 19 when they are not powered on, when all the exciting coils cannot be powered on, at least the adjustment of the forward and backward position of the seat section is secured by driving the motor. This can avoid a situation in which the driver cannot operate the vehicle because his foot cannot reach the pedals or his foot is caught by the dash board.

Figure 10:
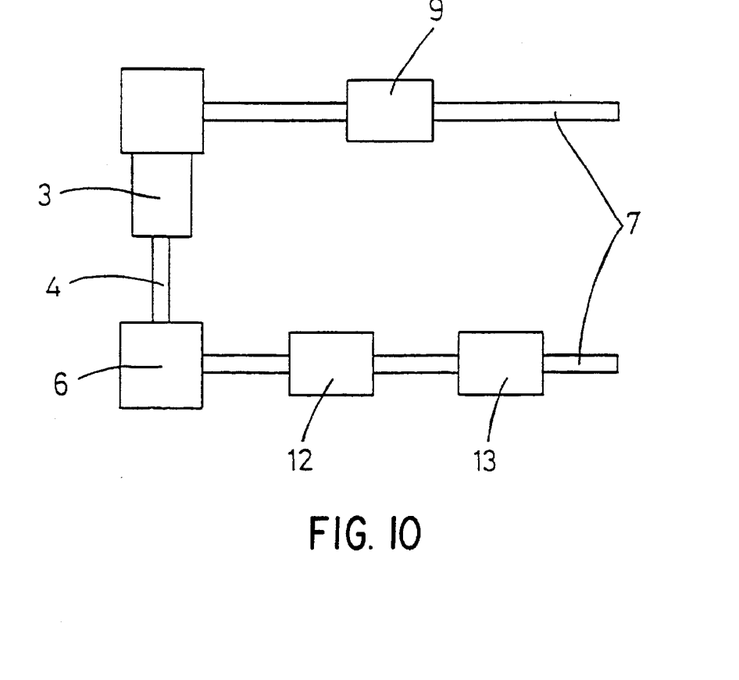
FIG. 10 is a schematic diagram showing a fourth embodiment of the arrangement of the electric driving apparatus.
Figure 11:
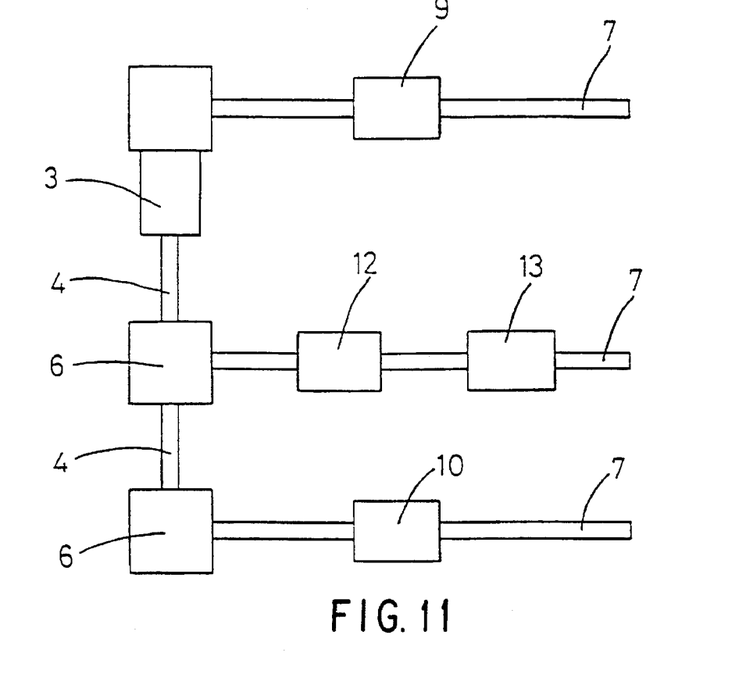
FIG. 11 is a schematic diagram showing a fifth embodiment of the arrangement of the electric driving apparatus.

On the other hand, the arrangement of the electric driving apparatus using the nut members and the operating threaded shafts is not confined to the above described embodiment, but, as shown in FIG. 10, the nut member 9 which adjusts the forward and backward position of the seat section may be mounted on one of two operating threaded shafts 7 and the nut members which adjust the heights of the seat at the front and rear ends may be mounted on the second operating threaded shaft 7. As a further embodiment, three operating threaded shafts 7 may be used as shown in FIG. 11, the nut members 12, 13 for adjusting the heights of the seat at the front and rear ends may be mounted on the operating threaded shaft 7 located in the center and the nut members 9, 10 for adjusting the forward and backward position of the seat section may be mounted on the operating threaded shafts 7, 7 located on both sides. Other arrangements may be applied, however, the embodiments shown in FIGS. 10, 11 have the advantage that the operating threaded shafts can be shorter than in the first embodiment described above.

Because the present invention is configured as described above, the adjustments of the forward and backward position of the seat section and the heights of the seat at the front and rear ends can be selectively performed by driving the electric motor under the first shift condition where the first clutch body is engaged with the nut body contained in the nut member for making a corresponding adjustment by the clutch operating means. When adjusting the height of the seat at the rear end, a corresponding nut member is set in the first shift condition where the nut body is disengaged from the second clutch body and engaged with the first clutch body by means of the clutch operating means and the other nut members are set in the second shift condition. Under this condition, the electric motor is driven in a normal or reverse turn. Consequently, only the second nut member moves back and forth relative to the operating threaded shaft to achieve the adjustment of the height.

As described above, the present invention has achieved automatic adjustments of the forward and backward position of the seat section and the heights of the seat at the front and rear ends by electric driving force. The adjustments of the forward and backward position of the seat section and the heights of the seat at the front and rear ends can be selected by controlling the power to be supplied to the exciting coils by means of the clutch operating means provided in the first and second nut members. Thus, the drive control of the adjusting devices can be achieved by driving a single electric motor, eliminating the necessity of mounting a dedicated motor on each adjusting device. As a result, a large number of the adjusting parts are used in common, thereby minimizing the number of the parts, reducing the weight of the apparatus, simplifying the structure of the apparatus and further simplifying assembly which leads to a reduction in manufacturing cost.

What is claimed is:

1. A power seat driving apparatus for a vehicle, comprising:

a seat section;

an electric motor mounted in said seat section;

a plurality of operating threaded shafts having a locking section which are rotated by said electric motor; and a plurality of nut members which are connected to said seat section, each nut member threadably received on an operating threaded shaft of said plurality of operating threaded shafts, the power seat driving apparatus being structured to move said seat section back and forth relative to said plurality of operating threaded shafts by a movement of at least one said nut member, each said nut member driven by said operating threaded shaft to which it is mounted by the normal or reverse rotation of said electric motor, at least two additional nut members being mounted to at least one of said plurality of operating threaded shafts to selectively achieve a different adjustment of said seat section from the adjustment of a forward and backward position of said seat section by the movement of said at least two additional nut members relative to said at least one operating threaded shaft to which it is mounted, all said nut members cooperating with said operating threaded shaft to which it is mounted and on whose circumference said locking section is formed, each said nut member having:

a casing through which said operating threaded shaft to which said nut member is mounted passes;

a nut body which is housed in said casing and which is threadably and rotatably supported by said operating threaded shaft to which said nut member is mounted in the axial dimension thereof;

a first clutch body through which said operating threaded shaft to which said nut member is mounted passes, said first clutch body being non-rotatably but axially movable with respect to said nut body and which is provided on one side of said nut body so that said clutch body is capable of being engaged with said one side of said nut body;

a second clutch body through which said operating threaded shaft to which said nut member is mounted passes, said second clutch body engaged with said locking section of said operating threaded shaft to which said nut member is mounted so as to rotate together with said operating threaded shaft to which said nut member is mounted, is capable of being engaged with a second side of said nut body and which is further capable of moving axially relative to said nut body;

a connecting lever which supportedly connects said first and second clutch bodies which are located facing each other on opposite ends of said nut body, said connecting lever having an interval which makes one clutch body disengage from said nut body when the other clutch body is engaged with said nut body; and a clutch operating means for switching said first and second clutch bodies between a first shift condition where said first clutch body is engaged with said nut body and a second shift condition where said second clutch body is engaged with said nut body.

2. The power seat driving apparatus as claimed in claim 1, further comprising a direction change mechanism for converting axial movement of said at least two additional nut members relative to said at least one operating threaded shaft to which said nut member is mounted from a substantially horizontal movement to a vertical movement of a front portion and a rear portion of said seat section, wherein when said first clutch body is engaged with said nut body of a first of said two additional nut members said front portion of said seat section is adjusted and when said first clutch body is engaged with said nut body of a second of said two additional nut members said rear portion of said seat section is adjusted.

3. The power seat driving apparatus as claimed in claim 1, wherein said plurality of operating threaded shafts comprises two operating threaded shafts and said plurality of nut members comprises four nut members, first and second nut members for adjusting the forward and backward position of said seat section, a third nut member for adjusting the height of a rear portion of said seat section, and a fourth nut member for adjusting a height of a forward portion of said seat section, said first nut member for forward and backward position adjustment of said seat section is mounted to a first one of said two operating threaded shafts along with said third nut member and said second nut member for adjusting the forward and backward position of said seat section is mounted to a second of said operating threaded shafts along with said fourth nut member.

4. The power seat driving apparatus as claimed in claim 1, wherein said plurality of operating threaded shafts comprises two operating threaded shafts and said plurality of nut members comprises a first nut body mounted to a first of said two operating threaded shafts for providing forward and backward position movement of said seat section, a second nut body mounted to a second of said two operating threaded shafts for providing a height adjustment to a front portion of said seat section, and a third nut member mounted to said second operating threaded shaft for providing a height adjustment to a rear portion of said seat section.

5. The power seat driving apparatus as claimed in claim 1, wherein said plurality of operating threaded shafts comprises three operating threaded shafts and said plurality of nut members comprises a first nut member mounted to a first operating threaded shaft of said plurality of operating threaded shafts for providing forward and backward position movement of said seat section, a second nut member mounted to a second operating threaded shaft of said plurality of operating threaded shafts for also providing forward and backward position movement of said seat section, a third nut member mounted to a third operating threaded shaft of said plurality of operating threaded shafts positioned between said first and second operating threaded shafts for providing height adjustment for a rear portion of said seat section, and a fourth nut member mounted to said third operating threaded shaft for providing height adjustment to a front portion of said seat section.

6. The power seat driving apparatus as claimed in claim 1, wherein when said clutch operating means of said nut member is in said first shift condition, said nut member is moved axially along said operating threaded shaft to which it is mounted during rotation of said operating threaded shaft to which it is mounted and when said clutch operating means of said nut member is in said second shift condition, said nut body of said nut member rotates with said operating threaded shaft to which it is mounted such that said nut member does not move axially along said operating threaded shaft to which it is mounted during rotation.

7. A power seat adjusting apparatus for a vehicle having a longitudinal axis, comprising:

a seat frame mounting a seat;

power means for providing power for adjusting a position and orientation of said seat frame;

first adjustment means for adjusting said seat frame in a forward and rearward direction with respect to the longitudinal axis of the vehicle;

second adjustment means for adjusting a height of a front portion of said seat frame;

third adjustment means for adjusting a height of a rear portion of said seat frame;

power transmission means for transmitting a power output of said power means to each said adjustment means, said power transmission means comprising:

at least one drive shaft extending from said power means;

at least one operating threaded shaft associated with said at least one drive shaft, each said operating threaded shaft extending parallel to the longitudinal axis of the vehicle; and a gear mechanism linking each said operating threaded shaft to said drive shaft; and switch means associated with each of said first, second, and third adjustment means for activating and deactivating said first, second and third adjustment means, respectively, wherein said first, second and third adjustment means each comprise a nut member threadably received on a one of said operating threaded shafts, each said nut member comprising:

a casing through which said operating threaded shaft passes;

a nut body that is threadably and rotatably supported in the axial direction of said operating threaded shaft by said casing;

a first clutch body through which said operating threaded shaft passes, said first clutch body being non-rotatable but axially movable with respect to said nut body, said first clutch body provided on one side of said nut body, and being capable of engagement with said one side of said nut body;

a second clutch body through which said operating threaded shaft passes, said second clutch body engaged with said operating threaded shaft so as to rotate together with said operating threaded shaft and which is capable of axial movement relative to said nut body, said second clutch body being capable of engagement with a second side of said nut body;

a connecting lever which supportedly connects said first and second clutch bodies which are located facing each other on opposite ends of said nut body, said connecting lever having an interval which makes one of said first and second clutch bodies disengage from said nut body when the other of said first and second clutch bodies is engaged with said nut body; and a clutch operating means for switching said first and second clutch bodies between a first shift condition where said first clutch body is engaged with said nut body and a second shift condition where said second clutch body is engaged with said nut body.

8. The seat adjusting apparatus as claimed in claim 7, further comprising a direction change mechanism for converting an axial movement of said nut members comprising said second and third adjustment means relative to said operating threaded shafts from a substantially horizontal movement to a vertical movement of said front portion and said rear portion of said seat frame respectively, wherein when said first clutch body of said second adjustment means is engaged with said nut body the height of said front portion of said seat frame is adjusted and when said first clutch body of said third adjustment means is engaged with said nut body the height of said rear portion of said seat frame is adjusted.

9. The seat adjusting apparatus as claimed in claim 7, comprising two operating threaded shafts and four nut members, first and second nut members for adjusting a position in the forward and rearward direction of said seat frame, a third nut member for adjusting the height of a rear portion of said seat frame, and a fourth nut member for adjusting a height of a forward portion of said seat frame, one of said first and second nut members for forward and rearward position adjustment of said seat frame rotatably mounted to a first one of said two operating threaded shafts along with said third nut member and the other of said first and second nut members for adjusting the forward and backward position of said seat frame mounted to a second of said operating threaded shafts along with said fourth nut member.

10. The seat adjusting apparatus as claimed in claim 7, comprising two operating threaded shafts, a first nut body mounted to a first of said two operating threaded shafts for providing the forward and backward position movement of the seat frame, a second nut body mounted to a second of said two operating threaded shafts for providing a height adjustment to a front portion of said seat frame, and a third nut member mounted to said second operating threaded shaft for providing a height adjustment to a rear portion of said seat frame.

11. The seat adjusting apparatus as claimed in claim 7, comprising three operating threaded shafts, a first nut member mounted to a first operating threaded shaft for providing the forward and rearward direction movement of said seat frame, a second nut member mounted to a second operating threaded shaft for also providing the forward and backward position movement of said seat frame, a third nut member mounted to a third operating threaded shaft positioned between said first and second operating threaded shafts for providing height adjustment for a rear portion of said seat frame, and a fourth nut member mounted to said third operating threaded shaft for providing height adjustment to a front section of said seat frame.

12. The seat adjusting apparatus as claimed in claim 7, wherein when said clutch operating means of said nut member is in said first shift condition, said nut member is moved axially along said operating threaded shaft and when said clutch operating means of said nut member is in said second shift condition, said nut body of said nut member rotates with said operating threaded shaft such that said nut member does not move axially along said operating threaded shaft during the rotation.

\* \* \* \* \*

UNITED STATES PATENT AND TRADEMARK OFFICE
CERTIFICATE OF CORRECTION

PATENT NO.   :   5,462,337
DATED        :   October 31, 1995
INVENTOR(S)  :   Gensaku Yamakami It is certified that error appears in the above-indentified patent and that said Letters Patent is hereby corrected as shown below:

On the title page, item [73] Assignee, change "Matsuba" to read--Mitsuba--.

Signed and Sealed this

Thirteenth Day of August, 1996

Attest:

BRUCE LEHMAN

*Attesting Officer*            *Commissioner of Patents and Trademarks*